United States Patent [19]

Flannery et al.

[11] Patent Number: 4,746,632

[45] Date of Patent: May 24, 1988

[54] INORGANIC CRYSTALLINE FIBERS

[75] Inventors: James E. Flannery; Dale R. Wexell, both of Corning, N.Y.

[73] Assignee: Corning Glass Works, Corning, N.Y.

[21] Appl. No.: 904,663

[22] Filed: Sep. 8, 1986

[51] Int. Cl.$^4$ .................... C03C 10/16; C03C 13/00
[52] U.S. Cl. .......................... 501/3; 501/35; 501/57; 501/95
[58] Field of Search .................. 501/3, 35, 57, 59, 95

[56] References Cited

U.S. PATENT DOCUMENTS

| | | | |
|---|---|---|---|
| 2,920,971 | 1/1960 | Stookey | 501/4 X |
| 3,464,836 | 9/1969 | Pendleton et al. | 501/2 OR |
| 3,922,155 | 11/1975 | Broemer et al. | 501/57 X |
| 3,985,534 | 10/1976 | Flannery et al. | 501/3 X |
| 4,120,730 | 10/1978 | Trojer et al. | 501/73 X |
| 4,142,906 | 3/1979 | Iizawa | 501/59 X |
| 4,386,162 | 5/1983 | Beall | 501/59 X |
| 4,467,039 | 8/1984 | Beall et al. | 501/57 X |
| 4,503,157 | 3/1985 | Hatahira | 501/95 X |
| 4,608,348 | 8/1986 | Beall et al. | 501/57 X |

FOREIGN PATENT DOCUMENTS 1415628  11/1975  United Kingdom .
972541  10/1986  United Kingdom .

*Primary Examiner*—Mark L. Bell
*Assistant Examiner*—Karl Group
*Attorney, Agent, or Firm*—Clinton S. Janes, Jr.

[57] ABSTRACT

This invention is directed to the production of inorganic crystalline fibers containing a minor amount of $MoO_3$ and/or $WO_3$ and/or $As_2O_3$ and wherein the predominant crystal phase is selected from the group of a fluormica, a fluoramphibole, canasite, potassium and/or sodium fluorrichterite, fluorapatite, and a lithium-containing, beta-spodumene-type crystal.

2 Claims, No Drawings

INORGANIC CRYSTALLINE FIBERS

BACKGROUND OF THE INVENTION

This invention is directed to the production of six types of inorganic crystalline fibers:

(1) fibers wherein a fluormica constitutes the predominant crystal phase;
(2) fibers wherein a fluoramphibole constitutes the predominant crystal phase;
(3) fibers wherein canasite constitutes the predominant crystal phase;
(4) fibers wherein potassium and/or sodium fluorrichterite constitutes the predominant crystal phase;
(5) fibers wherein fluorapatite constitutes the predominant crystal phase; and
(6) fibers wherein a fluoride-containing, spodumene-type crystal constitutes the predominant crystal phase.

The production of inorganic crystalline articles containing a fluormica as the predominant crystal phase has been the subject of numerous disclosures. To illustrate:

U.S. Pat. No. 3,689,293 describes the preparation of such articles from precursor glass compositions in the $R_2O$-$MgO$-$(Al_2O_3,B_2O_3)$-$SiO_2$-$F$ system, wherein $R_2O$ is an alkali metal oxide. X-ray diffraction analyses identified the basic mica as corresponding to a fluorophlogopite solid solution; that solid solution commonly comprising three components: normal fluorophlogopite, $KMg_3AlSi_3O_{10}F_2$, boron fluorophlogopite, $KMg_3BSi_3O_{10}F_2$, and a subpotassic aluminous phlogopite whose extract composition was unknown but which was thought to approach close to $K_{0.8}Mg_{2.9}Al_{0.9}Si_{3.1}O_{10}F_2$.

U.S. Pat. No. 3,732,087 is drawn to articles wherein tetrasilicic fluormica crystals constitute the predominant crystal phase. Such articles are prepared by heat treating precursor glass articles having compositions within the $(K,Rb,Cs)_2O$-$(Sr,Ba,Cd)O$-$MgO$-$SiO_2$-$F$ system.

U.S. Pat. No. 3,756,838 is directed to articles wherein an alkali metal-free, alkaline earth metal fluormica constitutes the predominant crystal phase. Such articles are produced by heat treating parent glass articles having compositions in the $(Ba,Sr)O$-$MgO$-$Al_2O_3$-$SiO_2$-$F$ field.

The formation of inorganic crystalline articles wherein fluoramphibole crystals comprise the predominant crystal phase is disclosed in U.S. Pat. No. 3,839,056. Such articles are prepared by heat treating precursor glass articles having compositions within the $(Li,Na)_2O$-$(Ca,Mg)O$-$(Ca,Mg)O$-$(B,Al)_2O_3$-$SiO_2$-$F$ system. The backbone of the amphibole structure is formed by double silicate chains which are crosslinked alternately by oxygen and fluorine. Each double chain is made up of single chains arranged side-by-side in a herringbone pattern. Fluoramphibole crystals can have a fibrous or needle-like habit. The growth of such crystals in situ in glass articles can yield a fiber-containing matrix wherein the fibers are undamaged and, therefore, extremely strong. X-ray diffraction studies evidenced three different types of fluoramphibole crystal structures; viz., fluorrichterite, $Na_2CaMg_5Si_8O_{22}F_2$, fluormagnesiorichterite, $Na_2Mg_6Si_8O_{22}F_2$, and lithium-containing proto-amphibole, $LiMg_{6.5}Si_8O_{22}F_2$.

The production of inorganic crystalline articles containing canasite as the predominant crystal phase is described in U.S. Pat. No. 4,386,162. The crystals grown in situ through the heat treatment of parent glass bodies are conjectured as having the formula $Ca_5Na_4K_2[Si_{12}O_{30}]F_4$ with probable solid solution to $Ca_5Na_3K_3[Si_{12}O_{30}]F_4$. As is explained there, canasite consists of a multiple chain silicate demonstrating an anisotropic blade-like crystal habit. Electron microscopy and x-ray diffraction studies have indicated that, structurally, canasite crystals are composed of parallel silicate chains crosslinked to make a long, box-like backbone in which the potassium ions rest. Those complex chain units are crosslinked into groups of four and are separated by networks composed primarily of $Na(O,F)_6$ and $Ca(O,F)_6$ octahedra. That characteristic interlocking chain silicate structure has yielded articles exhibiting moduli of rupture in excess of 50,000 psi and exceptional toughness, i.e., resistance to impact.

Inorganic crystalline articles containing potassium fluorrichterite as the predominant crystal phase are disclosed in U.S. Pat. No. 4,467,039. Potassium ions are substituted in part for sodium ions in the fluorrichterite structure, resulting in crystals having the formula $KNaCaMg_5Si_8O_{22}F_2$. The habit of those crystals is strongly anisotropic and predominantly unidimensional. Fundamentally, the crystals consist of polymer chain silicates in which double or higher order multiple chains form the backbone.

Because the substance of animal and human bones consists essentially of hydroxyapatite, $Ca_5OH(PO_4)_3$, which is permeated in an intimate mixture of albuminoids (collagen), considerable research has been undertaken to synthesize the mineral hydroxyapatite and its fluoride-containing analog, $Ca_5F(PO_4)_3$, for use as bone implant and bone replacement materials. U.S. Pat. Nos. 3,922,155, 4,120,730, and 4,131,597 are illustrative of the research which has been directed to the production of glass-ceramic materials containing fluorapatite at the predominant crystal phase.

Inorganic crystalline articles containing spodumene (classic formula $Li_2O:Al_2O_3:4SiO_2$) as the predominant crystal phase have been extensively marketed, principally because of their low coefficient of thermal expansion and their relatively high refractoriness. Such articles were first described in U.S. Pat. No. 2,920,971, and have been the subject of numerous subsequent patents.

SUMMARY OF THE INVENTION

The primary objective of the instant invention is to prepare inorganic crystalline fibers having compositions hitherto unknown in the field of such fibers, and to provide a novel method for synthesizing such fibers. Thus, six distinctive types of inorganic crystalline fibers have been produced wherein the predominant crystal phase developed is one of the following: (1) a fluormica selected from the group of normal fluorophlogopite, boron fluorophlogopite, subpotassic aluminous phlogopite, tetrasilicic fluormica, and an alkali metal-free, alkaline earth metal fluormica; (2) a fluoramphibole selected from the group of fluorrichterite, fluor-magnesio-richterite, and lithium-containing proto-amphibole; (3) canasite; (4) potassium and/or sodium fluorrichterite; (5) fluorapatite; and (6) a spodumene solid solution-type crystal containing fluoride. Each of those fibers is prepared from base compositions having the stoichiometry of or in the near vicinity of the stoichiometry of the particular crystal phase desired into which $MoO_3$ and/or $WO_3$ and/or $As_2O_3$ are incorporated within about 0.5–5% by weight total, and wherein the original batch contains fluoride within about 15–60 mole percent excess of that required stoichiometrically to form the desired crystal. A minor amount of $MoO_3$ and/or $WO_3$ and/or $As_2O_3$ is present in the fibers. It must be noted that the action of $As_2O_3$ in developing fiber growth is much less dramatic than that of $MoO_3$ or $WO_3$. Higher concentrations of $As_2O_3$ (~3–5%) are generally required to grow crystalline fibers. Therefore, $MoO_3$ and $WO_3$ are the preferred agents to obtain the desired crystalline fibers.

Three general processes have been devised to prepare the desired fibers:

(A) batches are melted, the melt cooled to a temperature below the transformation range thereof and simultaneously shaped into a body of a desired geometry, and the body heated in a closed container at a temperature within the range of about 800°–1000° C. for a period of time sufficient to grow fibers projecting from the surface of the body;

(B) batches free from $MoO_3$ and/or $WO_3$ and/or $As_2O_3$ are melted, the melt cooled to a temperature below the transformation range thereof and simultaneously shaped into a body of a desired geometry, the body comminuted to finely-divided particles, the particles mixed with finely-divided particles of $MoO_3$ and/or $WO_3$ and/or $As_2O_3$, and that mixture heated in a closed container at a temperature within the range of about 800°–1000° C. for a period of time sufficient to grow fibers projecting from the surface of the particles; and (C) batch materials in finely-divided particulate form corresponding to or closely approximating the stoichiometry of the desired crystalline fibers and including appropriate amounts of $MoO_3$ and/or $WO_3$ and/or $As_2O_3$ and fluoride are mixed together, that mixture is formed into a body of a desired configuration, and that body is fired in a closed container at about 800°–1000° C. for a period of time sufficient to grow fibers projecting from the surface of the body.

Inasmuch as the growth of the fibers takes place on the surface of the precursor bodies, it will be appreciated that increasing the surface area available for fiber growth leads to increased fiber production. Consequently, the precursor body will customarily be fired in the form of finely-divided particles to effect the greatest yield of fibers. One efficient method for producing such particles without extensive crushing, pulverizing, etc., involves the well-known practice of "drigaging"; i.e., the melt is run as a stream into cold water. Of course, the resulting particles can be comminuted still further, if desired. Another method for increasing the fiber production involves the heat treatment of the precursor body in the form of plates of large area, but of relatively thin thickness dimension (~0.25″–0.5″).

Although the mechanism of fiber growth has not been fully elucidated, because the fibers grow well in covered containers, but not in open containers, and because the addition of $MoO_3$ and fluoride to $MoO_3$-free compositions, while heat treating such compositions, gives rise to fiber production, it has been theorized that the fibers are produced through a combination bulk diffusion and vapor deposition process wherein $MoO_2F_2$ acts as a growth promoter. That theory is further supported by the high temperature mass spectrometric identification of the moiety $Mo_2F_2$ in the vapor species evolved from the compositions being heat treated to yield fluormica and fluorapatite fibers. Further, a comparison of chemical analyses of those fibers with the parent body has shown a content of $MoO_3$ in the crystalline fibers; that factor also strongly suggesting that molybdenum promotes and participates in the structural growth of fibers and that it is delivered via the gaseous phase.

Whereas the function of $WO_3$ has not been studied as extensively as that of $MoO_3$, because the growth of fibers requires the presence of $WO_3$ and fluoride, coupled with heat treatment in a closed container and the identification of a $WO_2F_2$ moiety in the vapor species, it is postulated that a like mechanism is involved in its action in producing the desired crystalline fibers.

Again, the operation of $As_2O_3$ in sponsoring the growth of fibers has not been analyzed in substantial detail. Nevertheless, because the growth of fibers requires the presence of $As_2O_3$ and fluoride, coupled with heat treatment in a closed container, plus the fact that $AsF_3$ and $AsF_5$ have been identified in the vapor phase, it has been hypothesized that a similar solid state diffusion/vapor deposition mechanism is also operative here.

The fiber growth commonly takes on the appearance of a dense mat of fibers projecting from the surface of a body; the diameters of the fibers ranging within about 0.5–10 microns, the lengths thereof ranging up to about one inch (2.54 cm), and the aspect ratios thereof ranging up to and in excess of 1000 to 1.

PRIOR ART

U.S. Pat. No. 3,464,836 discloses the production of fibers containing at least 15% by weight BaO and at least 50% by weight of a crystal phase selected from the group of spodumene, jadeite ($Na_2O:Al_2O_3:4SiO_2$), and benitoite ($BaO:TiO_2:3SiO_2$). $MoO_3$, $WO_3$, $As_2O_3$, and fluoride are nowhere referred to in the patent. Because of the absence of any reference to fluoride, a fluoride-containing spodumene could not have been prepared.

U.S. Pat. No. 4,484,950 describes the formation of fibers selected from the group of calcium metaphosphate, calcium sodium phosphate, and calcium lithium phosphate, $MoO_3$, $WO_3$, $As_2O_3$, fluoride, and apatite crystals are nowhere mentioned in the patent.

U.S. Pat. No. 4,503,157 is directed to the preparation of sintered composite bodies consisting of mineral fibers entrained within an apatite matrix. The apatite body is produced by hot pressing powders of apatite (fluorapatite is mentioned as a starting material) to sinter the apatite material into a unitary body. No reference is made to $MoO_3$, $WO_3$ or $As_2O_3$. Where a fiber reinforced article is desired, the fibers are mixed into the apatite powder and that mixture sintered together through hot pressing.

British Patent No. 972,541 is drawn to the hydrothermal production of fibers having the general formula $Na_xH_yM_z(Si_4O_{11})_2(OH)_mF_n$, wherein M is at least one metal selected from the group of Co, Mg, and Ni, x is 1.5–3, y is 0.2–2, z is 5–6, m is 0–2, n is 0–2, n+m=2, and x+y=14. $MoO_3$, $WO_3$, and $As_2O_3$ are nowhere mentioned and the products of the patent have compositions outside of those of the present invention.

British Patent No. 1,415,628 specifically discusses the formation of fibers wherein the crystal phase is β-eucryptite or β-spodumene. The patent also alludes to the preparation of fibers containing crystals of cordierite, mullite, spinel, corundum, nepheline, anorthite, forsterite, or albite, but no working examples in support thereof are provided. NaF and $CaF_2$ are referred to as possible nucleating agents, but there is no suggestion that the crystals contained fluoride. Moreover, neither $MoO_3$, $WO_3$, nor $As_2O_3$ is mentioned and there is no requirement of firing the precursor body in a closed container.

DESCRIPTION OF PREFERRED EMBODIMENTS

Whereas the following discussion involved laboratory work, it will be appreciated that the inventive method can be scaled up to commercial practice.

Fluormica Fibers

Table I records a number of compositions illustrating the capability of the present invention for producing inorganic crystalline fibers containing fluormica as the predominant crystal phase. The compositions are tabulated in terms of mole percent on the oxide basis except for the concentrations of $MoO_3$, $WO_3$, $As_2O_3$, $V_2O_5$, $Cr_2O_3$, $MnO_2$, ZnO, NiO, and $Co_2O_3$, which are reported in terms of weight percent in addition to the base composition. Because it is not known with which cation(s) the fluoride is combined, it is merely listed in terms of F and the oxygen=fluorine correction factor entered in accordance with conventional analysis practice. The actual batch ingredients may comprise any materials, either oxides or other compounds, which, when melted together, will be converted into the desired oxide in the proper proportion. In the compositions of Table I, an alkaline earth metal fluoride and/or an alkali metal silicofluoride customarily provided the source of fluoride.

The batch constituents were compounded, mixed together in a tumble mill, and the mixtures charged into platinum or silica crucibles. (Fiber yield did not appear to be influenced by the type of crucible.) Lids were placed onto the crucibles and the crucibles then introduced into an electrically-fired furnace operating at about 1400°–1500° C. After about 3–4 hours the melts were either drigaged by running into a bath of cold tap water or cast into steel molds to produce glass slabs of various sizes up to 14" squares with a thickness of 1". To reduce the extent of fluoride volatilization, the slabs were not annealed. Before heat treating those slabs, a 0.25" surface layer was removed therefrom in order to expose the fluoride-rich interior of the slabs.

TABLE I

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| $SiO_2$ | 42.0 | 42.0 | 42.0 | 42.0 | 42.0 | 42.0 | 42.0 | 42.0 | 42.9 | 42.9 | 42.9 | 42.9 | 42.9 | 42.9 | 42.9 | 42.9 | 42.9 | 42.0 | 42.0 | 42.0 | 42.0 | 42.0 |
| MgO | 29.4 | 29.4 | 29.4 | 29.4 | 29.4 | 29.4 | 29.4 | 29.4 | 31.3 | 31.3 | 31.3 | 31.3 | 31.3 | 31.3 | 31.3 | 31.3 | 31.3 | 29.4 | 29.4 | 29.4 | 29.4 | 29.4 |
| $Na_2O$ | 4.0 | 4.0 | 4.0 | 4.0 | 4.0 | 4.0 | 4.0 | 4.0 | 4.3 | 4.3 | 4.3 | 4.3 | 4.3 | 4.3 | 4.3 | 4.3 | 4.3 | 4.0 | 4.0 | 4.0 | 4.0 | 4.0 |
| $K_2O$ | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| CaO | | | | | | | | | 0.71 | 0.71 | 0.71 | 0.71 | 0.71 | 0.71 | 0.71 | 0.71 | 0.71 | | | | | |
| $MnO_2$ | | | | | | | | | | | | | | | | | | | | | | |
| ZnO | | | | | | | | | | | | | | | | | | | | | | |
| $Co_2O_3$ | | | | | | | | | | | | | | | | | | | | | | |
| NiO | | | | | | | | | | | | | | | | | | | | | | |
| SrO | | | | | | | | | | | | | | | | | | | | | | |
| BaO | | | | | | | | | | | | | | | | | | | | | | |
| $Al_2O_3$ | | | | | | | | | | | | | | | | | | | | | | |
| $B_2O_3$ | | | | | | | | | | | | | | | | | | | | | | |
| $Li_2O$ | | | | | | | | | | | | | | | | | | | | | | |
| F | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 |
| | 103.4 | 103.4 | 103.4 | 103.4 | 103.4 | 103.4 | 103.4 | 103.4 | 107.21 | 107.21 | 107.21 | 107.21 | 107.21 | 107.21 | 107.21 | 107.21 | 107.21 | 103.4 | 103.4 | 103.4 | 103.4 | 103.4 |
| O = F | −3.4 | −3.4 | −3.4 | −3.4 | −3.4 | −3.4 | −3.4 | −3.4 | −7.21 | −7.21 | −7.21 | −7.21 | −7.21 | −7.21 | −7.21 | −7.21 | −7.21 | −3.4 | −3.4 | −3.4 | −3.4 | −3.4 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $MoO_3$ | — | 0.5 | 1.0 | 1.5 | 2.0 | 2.5 | 3.0 | 4.0 | 0.5 | 1.0 | 1.5 | 2.0 | 2.5 | 3.0 | 3.5 | 4.0 | 4.5 | 1.0 | 2.0 | 3.0 | — | — |
| $WO_3$ | | | | | | | | | | | | | | | | | | | | | 1.0 | 2.0 |
| $V_2O_3$ | | | | | | | | | | | | | | | | | | | | | | |
| $Cr_2O_3$ | | | | | | | | | | | | | | | | | | | | | | |
| $As_2O_3$ | | | | | | | | | | | | | | | | | | | | | | |

| | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|---|---|
| $SiO_2$ | 42.0 | 42.0 | 42.0 | 42.0 | 42.9 | 42.9 | 42.9 | 42.9 | 42.9 | 42.9 | 42.9 | 42.9 | 42.9 | 42.9 | 42.9 | 42.9 | 4.29 | 42.9 | 42.9 | 42.9 | 42.9 | 42.9 |
| MgO | 29.4 | 29.4 | 29.4 | 29.4 | 31.3 | 31.3 | 31.3 | 31.3 | 31.3 | 31.3 | 31.3 | 31.3 | 31.3 | 29.0 | 29.0 | 29.0 | 29.0 | 29.0 | 29.0 | 29.0 | 29.0 | 26.3 |
| $Na_2O$ | 4.0 | 4.0 | 4.0 | 4.0 | 4.3 | 4.3 | 4.3 | 4.3 | 4.3 | 4.3 | 4.3 | 4.3 | 4.3 | 4.3 | 4.3 | 4.3 | 4.3 | 4.3 | 4.3 | 4.3 | 4.3 | 4.3 |
| $K_2O$ | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| CaO | | | | | 0.71 | 0.71 | 0.71 | 0.71 | 0.71 | 0.71 | 0.71 | 0.71 | 0.71 | 0.71 | 0.71 | 0.71 | 0.71 | 0.71 | 0.71 | 0.71 | 0.71 | 0.71 |
| $MnO_2$ | | | | | | | | | | | | | | 2.27 | | | | | | | | |
| ZnO | | | | | | | | | | | | | | | | 2.27 | 2.27 | | | | | |
| $Co_2O_3$ | | | | | | | | | | | | | | | | | | 2.27 | 2.27 | | | |
| NiO | | | | | | | | | | | | | | | | | | | | 2.27 | 2.27 | |
| SrO | | | | | | | | | | | | | | | | | | | | | | 5.0 |
| BaO | | | | | | | | | | | | | | | | | | | | | | |
| $Al_2O_3$ | | | | | | | | | | | | | | | | | | | | | | |
| $B_2O_3$ | | | | | | | | | | | | | | | | | | | | | | |
| $Li_2O$ | | | 2.0 | 3.0 | | | | | | | | | | | | | | | | | | |
| F | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 | 27.0 |
| | 103.4 | 103.4 | 103.4 | 103.4 | 107.21 | 107.21 | 107.21 | 107.21 | 107.21 | 107.21 | 107.21 | 107.21 | 107.21 | 107.21 | 107.21 | 107.21 | 107.21 | 107.21 | 107.21 | 107.18 | 107.18 | 108.21 |
| O = F | −3.4 | −3.4 | −3.4 | −3.4 | −7.21 | −7.21 | −7.21 | −7.21 | −7.21 | −7.21 | −7.21 | −7.21 | −7.21 | −7.21 | −7.21 | −7.21 | −7.21 | −7.21 | −7.21 | −7.18 | −7.18 | −8.21 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $MoO_3$ | — | — | — | — | — | — | — | — | — | — | — | — | — | — | — | — | — | — | — | — | — | — |
| $WO_3$ | | | | | | | | | | | | | | | | | | | | | | |
| $V_2O_3$ | 3.0 | — | — | — | — | — | — | — | — | — | — | — | — | — | 2.27 | — | — | — | — | — | — | 2.5 |
| $Cr_2O_3$ | — | — | — | — | — | — | — | — | — | — | — | — | — | — | — | — | — | — | — | — | — | — |
| $As_2O_3$ | — | 1.0 | — | — | — | — | — | — | — | — | — | — | — | — | — | — | — | — | — | — | — | — |

| | 45 | 46 | 47 | 48 | 49 | 50 | 51 | 52 | 53 | 54 | 55 | 56 | 57 | 58 | 59 | 60 | 61 | 62 |
|---|---|---|---|---|---|---|---|---|---|---|---|---|---|---|---|---|---|---|
| $SiO_2$ | 42.9 | 42.9 | 42.9 | 42.9 | 42.9 | 42.9 | 41.0 | 40.0 | 42.0 | 42.0 | 42.0 | 41.5 | 40.0 | 42.9 | 42.9 | 42.9 | 42.9 | 42.9 |

TABLE I-continued

| | | | | | | | | | | | | | | | | | | |
|---|---|---|---|---|---|---|---|---|---|---|---|---|---|---|---|---|---|---|
| MgO | 21.3 | 26.3 | 21.3 | — | — | 21.3 | 29.4 | 29.4 | 29.4 | 29.4 | 29.4 | 29.4 | 29.4 | 31.3 | 31.3 | 31.3 | 31.3 | 31.3 |
| Na₂O | 4.3 | 4.3 | 4.3 | 4.3 | 4.3 | 4.3 | 4.0 | 4.0 | — | 2.0 | 4.0 | 4.0 | 4.0 | 4.3 | 4.3 | 4.3 | 4.3 | 4.3 |
| K₂O | 1.0 | 1.0 | 1.0 | 1.0 | 1.0 | 1.0 | 1.0 | — | 1.0 | 1.0 | — | 1.0 | 1.0 | 1.0 | 1.0 | 1.0 | 1.0 | 1.0 |
| CaO | 0.71 | 0.71 | 0.71 | 0.71 | 0.71 | 0.71 | — | — | — | — | — | 0.5 | 0 | 0.71 | 0.71 | 0.71 | 0.71 | 0.71 |
| MnO₂ | | | | | | | | | | | | | | | | | | |
| ZnO | — | — | — | — | — | — | — | — | — | — | — | — | — | | | | | |
| NiO | — | — | — | — | — | 5.0 | — | — | — | — | — | — | — | | | | | |
| Co₂O₃ | 10.0 | — | — | — | — | 5.0 | — | — | — | — | — | — | — | | | | | |
| SrO | — | 5.0 | 10.0 | 31.3 | — | — | — | — | — | — | — | — | — | — | — | — | — | — |
| BaO | — | — | — | — | 31.3 | — | 1.0 | — | — | — | — | — | 2.0 | | | | | |
| Al₂O₃ | — | — | — | — | — | — | — | 2.0 | — | — | — | — | 1.0 | | | | | |
| B₂O₃ | — | — | — | — | — | — | — | — | 4.0 | — | — | — | — | | | | | |
| Li₂O | | | | | | | | | | | | | | | | | | |
| F | 28.0 | 28.0 | 28.0 | 28.0 | 28.0 | 28.0 | 27.0 | 27.0 | 27.0 | 27.0 | 27.0 | 27.0 | 27.0 | 30.0 | 30.0 | 30.0 | 30.0 | 30.0 |
| | 108.21 | 108.21 | 108.21 | 108.21 | 108.21 | 108.21 | 103.4 | 103.4 | 103.4 | 103.4 | 103.4 | 103.4 | 103.4 | 110.21 | 110.21 | 110.21 | 110.21 | 110.21 |
| O = F | −8.21 | −8.21 | −8.21 | −8.21 | −8.21 | −8.21 | −3.4 | −3.4 | −3.4 | −3.4 | −3.4 | −3.4 | −3.4 | −10.21 | −10.21 | −10.21 | −10.21 | −10.21 |
| | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| MoO₃ | 2.5 | 2.5 | 2.5 | 2.5 | 2.5 | 2.5 | 2.0 | 2.0 | 2.0 | 2.0 | 2.0 | 2.0 | 2.0 | — | — | — | — | — |
| WO₃ | | | | | | | | | | | | | | 0.5 | 1.0 | 3.0 | 4.0 | 5.0 |
| V₂O₅ | | | | | | | | | | | | | | | | | | |
| Cr₂O₃ | | | | | | | | | | | | | | | | | | |
| As₂O₃ | | | | | | | | | | | | | | | | | | |

The glass samples were charged into glazed porcelain crucibles, covers placed thereupon, and the crucibles then introduced into an electrically-heated furnace. The temperature within the furnace was raised at a rate of about ~250° C./hour to a temperature suitable for inducing the desired growth of fibers, generally about 900°-990° C., and the temperature was maintained within that range for a sufficient length of time to achieve a substantial growth of fibers. Thereafter, the electric current to the furnace was cut off and the furnace allowed to cool with the crucibles retained therewithin. This latter procedure, termed "cooling at furnace rate", is simply a convenient practice which has no substantive effect upon the crystalline products. Likewise, the heating rate is not critical; much faster or slower rates would be equally useful. Finally, whereas specific dwell periods at individual temperatures were employed, that practice is, again, merely a matter of convenience. The temperature may be permitted to vary within the effective range for growing fibers.

Table II reports the heat treatment applied to each of the glass compositions contained within covered glazed porcelain crucibles, along with a visual appraisal of fiber growth. X-ray diffraction analyses of the fibers indicated a micaceous structure.

TABLE II

| Example No. | Heat Treatment | Visual Description |
|---|---|---|
| 1 | 968° C.-8 hours | None |
| 2 | " | Microscopic-sized |
| 3 | " | Very slight |
| 4 | " | Slight |
| 5 | " | Good* |
| 6 | " | Good* |
| 7 | " | Moderate |
| 8 | " | None |
| 9 | " | Slight |
| 10 | " | Better than 9 |
| 11 | " | Good* |
| 12 | " | Good* |
| 13 | " | Good* |
| 14 | " | Good* |
| 15 | " | Good* |
| 16 | " | Excellent** |
| 17 | " | Excellent** |
| 18 | " | None |
| 19 | " | None |
| 20 | " | None |
| 21 | " | None |
| 22 | " | None |
| 23 | " | None |
| 24 | " | None |
| 25 | " | None |
| 26 | " | None |
| 27 | " | Slight |
| 28 | " | Better than 27 |
| 29 | " | Good* |
| 30 | " | Microscopic-sized |
| 31 | " | " |
| 32 | " | " |
| 33 | " | " |
| 34 | " | " |
| 35 | " | " |
| 36 | 980° C.-10 hours | None |
| 37 | " | None |
| 38 | " | None |
| 39 | " | None |
| 40 | " | None |
| 41 | " | None |
| 42 | " | None |
| 43 | " | None |
| 44 | " | None |
| 45 | " | None |
| 46 | " | None |
| 47 | " | None |
| 48 | " | None |
| 49 | " | None |

TABLE II-continued

| Example No. | Heat Treatment | Visual Description |
|---|---|---|
| 50 | " | None |
| 51 | " | None |
| 52 | " | None |
| 53 | " | None |
| 54 | " | None |
| 55 | " | None |
| 56 | " | None |
| 57 | " | None |
| 58 | 950° C.-2 hours | None |
| 59 | " | None |
| 60 | " | Slight |
| 61 | " | Good* |
| 62 | " | Good* |

*Good indicates dense surface mat with fibers of 0.125"-0.25" length
**Excellent indicates dense surface mat with fibers of >0.25" length Table III records wet chemical analyses (weight percent) of the batch for Example 5, of the glass produced from melting the batch, and of the crystallized fibers derived by firing drigaged particles of the glass at 968° C. for 8 hours. The CaO is an impurity in the $MgCO_3$ batch material.

TABLE III

|  | Batch | Glass | Fibers |
|---|---|---|---|
| $SiO_2$ | 55.2 | 57.3 | 56.3 |
| MgO | 25.9 | 27.2 | 27.5 |
| $Na_2O$ | 5.7 | 6.11 | 5.82 |
| $K_2O$ | 2.1 | 2.46 | 1.96 |
| CaO | 0.25 | 0.30 | 0.87 |
| F | 11.2 | 10.7 | 7.96 |
| $MoO_3$ | 2.0 | 1.92 | 1.73 |

It is believed significant that the content of MgO in the glass and in the fibers is virtually the same, thereby indicating easy diffusion of $Mg^{+2}$ ions from the glass to the fiber. No magnesium-containing species was detected in the vapor phase at the growth temperature. This phenomenon is deemed surprising in view of the decreased contents of $Na^+$ and $K^+$ in the fibers when compared to the glass, since each of those ionic species would be expected to have a greater ion diffusion content than that of $Mg^{+2}$. The $Ca^{+2}$ ions also appear to diffuse preferentially to the fiber; the CaO content of the fiber is almost three times that of the glass on a weight basis (2.5 times on a molar basis). No species containing $Ca^{+2}$ ions has been detected in the vapor phase. The fluoride content of the glass indicates remarkably little loss thereof during melting; the fluoride content of the fibers is about 75% of that in the glass.

The Examples recited in Table I, coupled with the fiber growth descriptions in Table II, indicate that, whereas the base glass composition approximates the stoichiometry of a fluormica, a higher MgO content appears to induce a greater fiber yield. This circumstance is of special interest with regard to $WO_3$. Hence, Examples 18-20 evidenced no fiber formation; Examples 27-29 (higher MgO contents) exhibited fiber growth.

$V_2O_5$ and $Cr_2O_3$ were not effective in inducing substantial yields of fiber. Substitutions of $MnO_2$, ZnO, NiO, and $Co_2O_3$ for MgO in the higher MgO base compositions, as summarized in Examples 36-43, eliminated the growth of fibers with or without the inclusion of $MoO_3$. Likewise, the substitution of SrO and BaO for MgO prevented the growth of fibers even in the presence of $MoO_3$ (Examples 44-50). The various substitutions of $Al_2O_3$, $B_2O_3$, $Li_2O$, and CaO for $SiO_2$, as exemplified in Examples 51-57, resulted in no substantial growth of fibers. Such findings indicate the need to maintain the base composition close to the stoichiometry of fluormica to insure good fiber yield.

As can be observed in Examples 58-62, $As_2O_3$ promotes the growth of fibers when in concentrations of at least about 3% by weight.

Fluoramphibole Fibers

Table IV reports a number of compositions which, upon heat treatment, will yield fibers containing a fluoramphibole as the predominant crystal phase. The compositions are recorded in terms of weight percent on the oxide basis. Because it is not known with which cation(s) the fluoride is combined, it is simply tabulated as F and the oxygen=fluorine correction factor recited in accordance with conventional analysis practice. The actual batch ingredients may constitute any materials, either oxides or other compounds, which, when melted together, will be converted into the desired oxide in the proper proportions. In the compositions of Table IV, an alkaline earth metal fluoride and/or an alkali metal silicofluoride customarily comprised the source of fluoride.

The batch components were compounded, mixed together in a tumble mill, and those mixtures run into platinum or silica crucibles. Lids were placed onto the crucibles and the crucibles moved into an electrically-heated furnace operating at about 1400° C.–1500° C. After about 3-4 hours the melts were either drigaged or cast into steel molds similarly to the laboratory examples reported in Table I.

TABLE IV

|  | 63 | 64 | 65 | 66 | 67 | 68 | 69 |
|---|---|---|---|---|---|---|---|
| $SiO_2$ | 55.9 | 51.3 | 48.7 | 53.8 | 53.2 | 53.2 | 54.8 |
| MgO | 26.2 | 25.8 | 25.5 | 24.5 | 24.2 | 24.1 | 26.8 |
| $K_2O$ | 2.0 | 4.0 | 3.9 | — | — | — | 2.0 |
| $Li_2O$ | 3.6 | — | — | — | — | — | — |
| CaO | 0.86 | 0.3 | 0.3 | — | — | — | 0.75 |
| $Na_2O$ | — | 5.3 | 5.2 | 9.3 | 9.2 | 9.1 | 5.7 |
| $Al_2O_3$ | — | 1.1 | 4.3 | 1.1 | 2.2 | 3.2 | — |
| F | 11.5 | 12.2 | 12.0 | 11.4 | 11.2 | 11.2 | 10.8 |
| $MoO_3$ | 3.0 | 2.0 | 2.0 | 2.5 | 2.5 | 2.5 | 3.0 |
|  | 103.06 | 102.0 | 101.9 | 102.6 | 102.5 | 103.3 | 103.85 |
| O = F | −3.06 | −2.0 | −1.9 | −2.6 | −2.5 | −3.3 | −3.85 |
|  | 100.0 | 100.0 | 100.0 | 100.0 | 100.0 | 100.0 | 100.0 |

In like manner to the glasses of Examples 1–62, except that covered platinum crucibles were used instead of glazed procelain crucibles, the samples were heat treated in an electrically-fired furnace. In general, the heat treatment will be carried out at temperatures ranging from about 950°–1000° C., preferably at least 970° C. Hence, it has been observed that some glass compositions will yield fibers of fluormica at temperatures in the range of about 950°–970° C., but fibers of fluoramphibole at temperatures higher than 970° C. Again, the furnace was heated at a rate of about ~250° C./hour and permitted to cool to room temperature at furnace rate with the samples retained therewithin.

Table V records the heat treatment to which each sample was exposed and a visual description of the fibrous growth, along with an identification of the crystal phases present as determined through X-ray diffraction analysis. Fluormica was observed to be present as a secondary phase in several of the specimens. "Good" fiber growth indicates a dense surface mat of fibers having lengths of about 0.125–0.25″. "Fair" fiber growth signifies sparse surface coverage of fibers of about the same length.

TABLE V

| Example No. | Heat Treatment | Visual Description | Crystal Phases |
|---|---|---|---|
| 63 | 970° C. for 18 hours | Fair | Fluoramphibole |
| 64 | 970° C. for 18 hours | Good | Fluoramphibole + Fluormica |
| 65 | 970° C. for 18 hours | Good | Fluoramphibole + Fluormica |
| 66 | 970° C. for 18 hours | Good | Fluoramphibole + Fluormica |
| 67 | 970° C. for 18 hours | Good | Fluoramphibole + Fluormica |
| 68 | 970° C. for 18 hours | Good | Fluoramphibole + Fluormica |
| 69 | 970° C. for 18 hours | Good | Fluoramphibole |

Example 63 illustrates that $Li_2O$ may be substituted for $Na_2O$, but fiber production is reduced thereby. However, that substitution eliminates the growth of fluormica crystals. Examples 66–69 point out that the presence of $K_2O$ is not necessary for fiber generation. Finally, Example 69 indicates that higher firing temperatures promote the growth of fluoramphibole crystals at the expense of fluormica.

Canasite Fibers

Table VI lists a number of compositions in terms of mole percent on the oxide basis, except for the concentrations of $MoO_3$ which are reported in terms of weight percent in addition to the base composition, which, upon heat treatment, will yield fibers containing canasite as the predominant crystal phase. Because it is not known with which cation(s) the fluoride is combined, it is merely reported as F and the oxygen=fluorine correction factor tabulated in accordance with conventional analysis practice. The actual batch ingredients may be any materials, either oxides or other components, which, when melted together, will be converted into the desired oxide in the proper proportions. In the compositions of Table VI, an alkaline earth metal fluoride and/or an alkali metal silicofluoride customarily provided the source of fluoride.

The batch constituents were compounded, mixed together in a tumble mill, and those mixtures charged into platinum or silica crucibles. After placing lids thereon, the crucibles were introduced into an electrically-fired furnace operating at about 1400°–1500° C. and maintained therewithin for about 3–4 hours. Thereafter, the resulting melts were either drigaged or cast into steel molds in like manner to Examples 1–62 described above.

TABLE VI

|  | 70 | 71 | 72 | 73 | 74 | 75 | 76 | 77 | 78 | 79 | 80 | 81 | 82 | 83 | 84 |
|---|---|---|---|---|---|---|---|---|---|---|---|---|---|---|---|
| $SiO_2$ | 55.7 | 55.7 | 55.7 | 55.7 | 53.7 | 55.7 | 55.7 | 53.7 | 55.7 | 55.7 | 53.7 | 51.7 | 55.7 | 55.7 | 55.7 |
| CaO | 21.6 | 21.6 | 21.6 | 21.6 | 23.6 | 21.6 | 21.6 | 21.6 | 21.6 | 21.6 | 21.6 | 21.0 | 21.6 | 21.6 | 21.6 |
| $Na_2O$ | 9.6 | 9.6 | 11.6 | 7.6 | 9.6 | 8.6 | 9.6 | 10.6 | 8.5 | 12.9 | 9.6 | 10.6 | 8.5 | 5.6 | 12.9 |
| $K_2O$ | 7.3 | 7.3 | 5.3 | 9.3 | 7.3 | 6.3 | 7.3 | 8.3 | 8.5 | 4.0 | 9.3 | 10.3 | 8.5 | 11.3 | 4.0 |

TABLE VI-continued

|  | 70 | 71 | 72 | 73 | 74 | 75 | 76 | 77 | 78 | 79 | 80 | 81 | 82 | 83 | 84 |
|---|---|---|---|---|---|---|---|---|---|---|---|---|---|---|---|
| F | 35.0 | 35.0 | 35.0 | 35.0 | 35.0 | 35.0 | 35.0 | 35.0 | 35.0 | 35.0 | 35.0 | 35.0 | 35.0 | 35.0 | 35.0 |
|  | 129.2 | 129.2 | 129.2 | 129.2 | 129.2 | 129.2 | 129.2 | 129.2 | 129.3 | 129.2 | 129.2 | 129.6 | 129.3 | 129.2 | 129.2 |
| O=F | 29.2 | 29.2 | 29.2 | 29.2 | 29.2 | 29.2 | 29.2 | 29.2 | −29.3 | −29.2 | −29.2 | −29.6 | −29.3 | −29.2 | −29.2 |
|  | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| $MoO_3$ | — | 2.0 | 2.0 | 2.0 | 2.0 | 2.0 | 4.0 | 2.0 | 2.0 | 2.0 | 2.0 | 2.0 | 2.0 | 2.0 | 2.0 |

Table VII records another group of glass compositions which, when heat treated, will produce fibers containing canasite as the predominant crystal phase. The compositions are tabulated in terms of weight percent on the oxide basis. The batch ingredients were compounded, mixed together, and melted in like manner to Examples 70–84 above.

TABLE VII

|  | 85 | 86 | 87 | 88 | 89 | 90 | 91 |
|---|---|---|---|---|---|---|---|
| $SiO_2$ | 46.5 | 46.2 | 46.5 | 46.1 | 45.9 | 45.7 | 45.9 |
| CaO | 18.1 | 18.0 | 18.1 | 18.0 | 17.9 | 17.8 | 17.4 |
| $Na_2O$ | 9.8 | 9.8 | 9.8 | 9.7 | 9.7 | 9.7 | 9.7 |
| $K_2O$ | 14.5 | 14.5 | 14.5 | 14.4 | 14.4 | 14.4 | 14.4 |
| F | 11.1 | 11.6 | 11.1 | 11.8 | 12.1 | 12.6 | 12.2 |
| $MoO_3$ | 2.5 | 2.5 | 3.5 | 2.5 | 3.5 | 2.5 | 2.5 |
|  | 102.5 | 102.6 | 103.5 | 102.5 | 103.5 | 102.7 | 102.1 |
| O = F | 2.5 | −2.6 | −3.5 | −2.5 | −3.5 | −2.7 | −2.1 |
|  | 100.0 | 100.0 | 100.0 | 100.0 | 100.0 | 100.0 | 100.0 |

The glass samples were loaded into platinum crucibles, lids placed thereon, and the crucibles moved into an electrically-heated furnace. In like manner to Examples 1–84 above, the temperature of the furnace was raised at about ~250° C./hour to the value reported in Table VIII. After being held at that temperature for the period of time also recorded in Table VIII, the crucibles were cooled to room temperature at furnace rate. In general, the temperature to produce the desired fibers will range between 800°–950° C., temperatures above 825° C. being preferred.

It was observed that fiber growth is independent not only upon composition, but also upon the temperature and time period of heat treatment; i.e., high temperatures and/or longer periods of heat treatment yield fibers of greater length.

Table VIII lists the heat treatment applied to each sample and a visual description of the product resulting therefrom. "Superior" indicates a dense surface covering of fibers having lengths of about 0.5–0.75" with diameters between about 5–15 microns; "Excellent" signifies a dense surface covering of fibers exhibiting lengths of about 0.5"; "Good" designates a dense surface covering of fibers exhibiting lengths up to about 0.25"; "Fair" defines a rather sparse surface covering of fibers with lengths up to 0.5"; "Poor" refers to a sparse surface covering of fibers having lengths up to 0.25". X-ray diffraction analyses identified the canasite structure.

TABLE VIII

| Example No. | Heat Treatment | Visual Description |
|---|---|---|
| 70 | 910° C. for 12 hours | None |
| 71 | " | Good |
| 72 | " | " |
| 73 | " | " |
| 74 | " | " |
| 75 | " | " |
| 76 | " | " |
| 77 | " | " |
| 78 | " | " |
| 79 | " | Poor, glass softened |
| 80 | " | None, glass melted |
| 81 | 875° C. for 48 hours | Fair |
| 82 | 860° C. for 45 hours | Good |
| 83 | " | " |
| 84 | " | " |
| 85 | 840° C. for 48 hours | Excellent |
| 86 | " | " |
| 87 | " | " |
| 88 | " | Superior |
| 89 | " | Fair |
| 90 | " | " |
| 91 | " | Poor |

As was observed above with respect to fluormica and fluoramphibole glass compositions, no fiber growth was experienced when the glass samples were heat treated in open crucibles. That circumstance confirms the importance of maintaining an appropriate gaseous fluoride atmosphere and supports the proposed mechanism of fiber growth being based partially upon gaseous diffusion.

Potassium and/or Sodium Fluorrichterite Fibers

Table IX recites a group of compositions, tabulated in terms of mole percent on the oxide basis, which, when heat treated in a particular manner, will produce fibers containing potassium and/or sodium fluorrichterite as the predominant crystal phase. The $MoO_3$, $WO_3$, and $As_2O_3$ contents are expressed in terms of weight percent in excess of the phase composition. Inasmuch as it is not known with which cation(s) the fluoride is combined, it is simply recorded in terms of F and the oxygen=fluorine correction factor entered in accordance with conventional analysis practice. The actual batch ingredients may be any materials, either oxides or other compounds, which, when melted together, will be converted into the desired oxide in the proper proportions. In the glasses of Table VIII, an alkaline earth metal fluoride and/or an alkali metal silicofluoride customarily furnished the source of the oxide.

The batch ingredients were compounded, mixed together in a tumble mill, and those mixtures run into platinum or silica crucibles. Covers were placed onto the crucibles and the crucibles were moved into an electrically-fired furnace operating at about 1400°–1500° C. After a residence time of about 3–4 hours, the resulting melts were either drigaged or poured into steel molds, as described above with respect to Examples 1–91.

TABLE IX

|  | 92 | 93 | 94 | 95 | 96 | 97 | 98 | 99 | 100 | 101 | 102 | 103 | 104 |
|---|---|---|---|---|---|---|---|---|---|---|---|---|---|
| $SiO_2$ | 53.33 | 53.33 | 53.33 | 53.33 | 53.33 | 53.33 | 53.33 | 53.33 | 53.33 | 53.33 | 53.33 | 53.33 | 53.33 |
| $Na_2O$ | 6.67 | 6.67 | 6.67 | 6.67 | 6.67 | 6.67 | 6.67 | — | 2.00 | — | — | — | — |
| $K_2O$ |  |  |  |  |  |  |  | 6.67 | 4.67 | 6.67 | 6.67 | 6.67 | 6.67 |
| CaO | 6.67 | 6.67 | 6.67 | 6.67 | 6.67 | — | — | 6.67 | 6.67 | 6.67 | 6.67 | — | — |
| MgO | 33.33 | 33.33 | 33.33 | 33.33 | 33.33 | 33.33 | 33.33 | 33.33 | 33.33 | 33.33 | 33.33 | 33.33 | 26.63 |
| SrO | — | — | — | — | — | 6.67 | — |  |  |  |  |  |  |
| BaO | — | — | — | — | — | — | 6.67 |  |  |  |  |  |  |
| ZnO |  |  |  |  |  |  |  | — | — | — | — | 6.67 | 13.33 |
| F | 30.0 | 30.0 | 30.0 | 30.0 | 30.0 | 30.0 | 30.0 | 30.0 | 30.0 | 30.0 | 30.0 | 30.0 | 30.0 |
|  | 130.0 | 130.0 | 130.0 | 130.0 | 130.0 | 130.0 | 130.0 | 130.0 | 130.0 | 130.0 | 130.0 | 130.0 | 130.0 |
| O = F | −30.0 | −30.0 | −30.0 | −30.0 | −30.0 | −30.0 | −30.0 | −30.0 | −30.0 | −30.0 | −30.0 | −30.0 | −30.0 |
|  | 100.0 | 100.0 | 100.0 | 100.0 | 100.0 | 100.0 | 100.0 | 100.0 | 100.0 | 100.0 | 100.0 | 100.0 | 100.0 |
| $MoO_3$ | — | 3.2 | 1.98 | 5.05 | 1.0 | 1.99 | 2.1 | 2.0 | 2.1 | — | — | 2.6 | 2.6 |
| $WO_3$ |  |  |  |  |  |  |  | — | — | 3.2 | — | — | — |
| $As_2O_3$ |  |  |  |  |  |  |  | — | — | — | 4.1 | — | — |

Following the practice described above with respect to Examples 1-91, the glasses of Table IX were placed in covered silica crucibles and heat treated in an electrically-fired furnace. In general, heat treating temperatures of about 825°–900° C. will be required to generate the desired fluorrichterite-containing fibers, with temperatures between about 840°–875° C. being preferred. Once again, the furnace was heated at a rate of about ~250° C./hour and permitted to cool to room temperature at furnace rate.

Table X lists the heat treatment to which each sample was subjected and a visual description of the fibrous growth; X-ray diffraction analyses identified potassium or sodium fluorrichterite as the predominant crystal phase in each.

TABLE X

| Example | Heat Treatment | Visual Description |
|---|---|---|
| 92 | 850° C. for 24 hours | None |
| 93 | " | Dense growth* |
| 93 | " | Medium growth, some glass fusion |
| 94 | 900° C. for 24 hours | Medium growth |
| 95 | 850° C. for 24 hours | Dense growth |
| 96 | " | Microscopic growth |
| 97 | " | Medium-fair growth |
| 98 | " | Medium-fair growth |
| 99 | " | Dense growth |
| 99 | 900° C. for 24 hours | Dense growth, some glass fusion |
| 99 | 820° C. for 24 hours | Microscopic growth |
| 99 | 800° C. for 12 hours | None |
| 100 | 850° C. for 12 hours | Dense growth |
| 101 | 850° C. for 24 hours | Dense growth |
| 101 | 850° C. for 12 hours | Microscopic growth |
| 102 | 850° C. for 24 hours | Fair growth |
| 103 | 850° C. for 24 hours | Good growth** |

TABLE X-continued

| Example | Heat Treatment | Visual Description |
|---|---|---|
| 104 | 850° C. for 24 hours | Good growth** |

*Dense growth indicates a dense surface mat with fibers averaging about 0.25" in length.
**Good growth indicates a dense surface mat with fibers averaging about 0.125" in length.

Fluorapatite Crystalline Fibers

Table XI reports compositions, expressed in terms of mole percent on the oxide basis, which, upon exposure to a defined heat treatment, will produce fibers containing fluorapatite as the predominant crystal phase. Since it is not known with which cation(s) the fluoride is combined, it is merely recited in terms of F and the oxygen=fluorine correction factor listed in accordance with conventional analysis practice. The actual batch constituents may be any materials, either the oxides or other compounds, which, when melted together, will be converted into the desired oxide in the proper proportions. Table XII records another group of compositions, expressed in terms of weight percent on the oxide basis, illustrating the effect of $MoO_3$ content on the growth of fluorapatite fibers. In the compositions reported in Tables XI and XII, an alkaline earth metal fluoride and/or an alkali metal silicofluoride provided the source of fluoride.

The batch ingredients were compounded, mixed together in a tumble mill, and charged into platinum or silica crucibles. After placing lids thereon, the crucibles were moved into an electrically-fired furnace operating at about 1400°–1500° C. and held therewithin for 3–4 hours. The resulting melts were either drigaged or cast into steel molds in accordance with the practice outlined above.

TABLE XI

|  | 105 | 106 | 107 | 108 | 109 | 110 | 111 | 112 | 113 | 114 | 115 |
|---|---|---|---|---|---|---|---|---|---|---|---|
| $SiO_2$ | 46.25 | 46.25 | 46.25 | 43.0 | 43.0 | 43.0 | 43.0 | 43.0 | 43.0 | 43.0 | 43.0 |
| $Na_2O$ | 4.0 | 4.0 | 4.0 | 4.0 | 4.0 | 4.0 | 4.0 | 4.0 | 4.0 | 6.0 | 6.0 |
| $K_2O$ | 1.0 | 1.0 | 1.0 | 1.0 | 1.0 | 1.0 | 1.0 | 1.0 | 1.0 | 2.0 | 2.0 |
| $P_2O_5$ | 4.0 | 4.0 | 4.0 | 4.0 | 4.0 | 4.0 | 4.0 | 4.0 | 4.0 | 3.6 | 3.6 |
| CaO | 20.0 | — | — | 14.7 | — | — | 14.7 | 14.7 | — | 26.4 | — |
| SrO | — | — | 20.0 | — | — | 14.7 | — | 14.7 | — | — | — |
| BaO | — | 20.0 | — | — | 14.7 | — | 14.7 | — | — | — | 26.4 |
| MgO | — | — | — | 14.7 | 14.7 | 14.7 | — | — | 29.0 | — | — |
| F | 30.0 | 30.0 | 30.0 | 30.0 | 30.0 | 30.0 | 30.0 | 30.0 | 30.0 | 30.0 | 30.0 |
| $MoO_3$ | 0.75 | 0.75 | 0.75 | 0.75 | 0.75 | 0.75 | 0.75 | 0.75 | 0.75 | 1.5 | 1.5 |
|  | 106.0 | 106.0 | 106.0 | 112.15 | 112.15 | 112.15 | 112.15 | 112.15 | 111.75 | 112.5 | 112.5 |
| O = F | −6.0 | −6.0 | −6.0 | −12.15 | −12.15 | −12.15 | −12.15 | −12.15 | −11.75 | −12.5 | −12.5 |
|  | 100.0 | 100.0 | 100.0 | 100.0 | 100.0 | 100.0 | 100.0 | 100.0 | 100.0 | 100.0 | 100.0 |

TABLE XII

| | 116 | 117 | 118 | 119 | 120 |
|---|---|---|---|---|---|
| $SiO_2$ | 52.0 | 52.0 | 52.0 | 52.0 | 38.1 |
| $Na_2O$ | 4.64 | 4.64 | 4.64 | 4.64 | 3.4 |
| $K_2O$ | 1.75 | 1.75 | 1.75 | 1.75 | 1.3 |
| $P_2O_5$ | 10.7 | 10.7 | 10.7 | 10.7 | 7.8 |
| CaO | 21.0 | 21.0 | 21.0 | 21.0 | — |
| BaO | — | — | — | — | 42.1 |
| F | 12.0 | 12.0 | 12.0 | 12.0 | 12.0 |
| $MoO_3$ | 2.8 | 1.0 | 2.0 | 4.0 | 1.1 |
| | 104.89 | 103.09 | 104.09 | 106.09 | 105.8 |
| O = F | −4.89 | −3.09 | −4.09 | −6.09 | −5.8 |
| | 100.0 | 100.0 | 100.0 | 100.0 | 100.0 |

| | 121 | 122 | 123 | 124 |
|---|---|---|---|---|
| $SiO_2$ | 38.1 | 38.1 | 38.1 | 38.1 |
| $Na_2O$ | 3.4 | 3.4 | 3.4 | 3.4 |
| $K_2O$ | 1.3 | 1.3 | 1.3 | 1.3 |
| $P_2O_5$ | 7.8 | 7.8 | 7.8 | 7.8 |
| BaO | 42.1 | 42.1 | 42.1 | 42.1 |
| F | 12.0 | 12.0 | 12.0 | 12.0 |
| $MoO_3$ | 2.3 | 3.0 | 4.0 | 4.5 |
| | 107.0 | 107.7 | 108.7 | 109.2 |
| O = F | −7.0 | −7.7 | −8.7 | −9.2 |
| | 100.0 | 100.0 | 100.0 | 100.0 |

Following the procedure outlined above with respect to Examples 1–104, the glasses of Tables XI and XII were placed in glazed porcelain crucibles, the crucibles covered, and the crucibles moved to an electrically-fired furnace. The temperature within the furnace was raised at a rate of about ~500° C./hour to 900° C. and held at that temperature for 16 hours. Thereafter, yet again, the furnace was allowed to cool to room temperature at furnace rate. In general, exposure temperatures between about 850°–1000° C. will yield fluorapatite fibers, with temperatures between 900°–925° C. being preferred.

Table XIII presents a visual description of the fibrous growth developed in each heat treated sample. As defined in that Table, "Good" indicates a dense mat of fibers having lengths of at least 0.25" with diameters of about 5–15 microns. "Slight" and "Fair" represent smaller amounts of fiber growth which are visible only upon microscopic examination. X-ray diffraction analyses identified the hexagonal structure of apatite.

TABLE XIII

| Example No. | Visual Description |
|---|---|
| 105 | Good |
| 106 | " |
| 107 | " |
| 108 | Slight |
| 109 | Fair |
| 110 | Good |
| 111 | " |
| 112 | Fair-to-Good |
| 113 | Very slight |
| 114 | Good |
| 115 | Good (0.375" long) |
| 116 | Good |
| 117 | Slight |
| 118 | Good |
| 119 | " |
| 120 | Slight |
| 121 | Good |
| 122 | " |
| 123 | " |
| 124 | Fair |

The maximum level of $P_2O_5$ which can be incorporated in the glass which permits melting of the glass at temperatures below 1600° C. is about 4.5 mole percent. About 4% by weight $MoO_3$ represents the maximum solubility thereof in the glass; higher concentrations lead to increased volatilization of $MoO_3$ since that compound sublimes at about 800° C. It is of interest to note that even combinations of MgO (not normally compatible with the apatite structure) with CaO, SrO, or BaO in the base glass can produce good yields of fiber on heat treatment of the glass, generally up to 1:1 molar ratios of Mg:M, where M=Ca, Sr, or Ba. It has also been discovered that the addition of excess fluoride in the form of $NH_4HF_2$ to the samples in the covered crucibles leads to the formation of long fibers, i.e., about 0.5–1" in length (0.5–2 microns in diameter), upon heat treatment of the glass.

Table XIV records the results of chemical analyses performed on the fibers grown through the heat treatment of Examples 105, 106, and 107. The glass of Example 105 was heated at 920° C. for 16 hours; the glasses of Examples 106 and 107 were heated at 900° C. for 16 hours. An empirical formula for each fiber was calculated from the analyses and those formulae are also listed in Table XIV. Each formula was calculated on the basis of $(PO_4)^{-3}$ being 3.0, since $(PO_4)^{-3}$ is the most accurate analysis.

TABLE XIV

| | 105 | 106 | 107 |
|---|---|---|---|
| Ca | 41.44 | — | — |
| F | 3.78 | 1.77 | 1.91 |
| $(PO_4)^{-3}$ | 49.68 | 24.05 | 33.14 |
| $MoO_3$ | 4.72 | 4.52 | 4.35 |
| Sr | — | — | 60.72 |
| Ba | — | 67.97 | — |
| $Na_2O$ | <0.2 | 0.27 | 0.21 |
| $K_2O$ | <0.2 | <0.1 | <0.1 |
| $SiO_2$ | <0.1 | 0.2 | <0.1 |
| Empirical Formulae | | | |
| Example No. 105 | $Ca_{4.93}F_{0.95}(PO_4)_3$ | | |
| Example No. 106 | $Ba_{4.88}F_{0.88}(PO_4)_3$ | | |
| Example No. 107 | $Sr_{4.96}F_{0.91}(PO_4)_3$ | | |

The empirical formula calculated for each type of apatite fiber corresponds well with respect to the anticipated $M_5F(PO_4)_3$ stoichiometry with trace amounts of $Na_2O$, $K_2O$, and $SiO_2$ incorporated into the structure. The increased concentration of $MoO_3$ found in the fibers, as compared to that in the precursor glass, is consistent with the phenomenon observed above in the fluormica fibers. Such circumstance again supports the proposed mechanism for fiber growth; viz., that molybdenum promotes and participates in the structural growth of the apatite fibers and is delivered by means of the gaseous phase.

Fluoride-Containing, Spodumene-Type Fibers

Table XV recites compositions having the stoichiometry of classic spodumene ($Li_2O:Al_2O_3:4SiO_2$), expressed in terms of mole percent on the oxide basis, to which excess fluoride and $MoO_3$ were added, also reported in terms of mole percent. Because it is not known with which cation(s) the fluoride is combined, it is simply recorded in terms of F and the oxygen=fluorine correction factor tabulated in accordance with conventional analysis procedure. The actual batch components may comprise any materials, either oxides or other compounds, which, when melted together will be converted into the desired oxide in the proper proportions.

The batch ingredients were compounded, mixed together in a tumble mill, and charged into platinum crucibles. After placing lids thereon, the crucibles were moved into an electrically-fired furnace operating at 1450° C., maintained therewithin for three hours, and the melts then either drigaged or poured into steel molds in accordance with the practice described above.

TABLE XV

|        | 125   | 126   | 127   | 128    | 129   | 130   | 131   | 132   |
|--------|-------|-------|-------|--------|-------|-------|-------|-------|
| $SiO_2$ | 66.6  | 66.6  | 66.6  | 66.6   | 65.5  | 66.6  | 66.6  | 66.6  |
| $Al_2O_3$ | 16.7  | 16.7  | 16.7  | 16.7   | 16.4  | 16.7  | 16.7  | 16.7  |
| $Li_2O$ | 16.7  | 16.7  | 16.7  | 16.7   | 16.4  | 16.7  | 16.7  | 16.7  |
| $MoO_3$ | —     | 1.0   | 1.7   | 2.55   | 1.7   | 1.5   | 1.5   | —     |
| F      |       | 30.0  | 30.0  | 30.0   | —     | 15.0  | 5.0   | 30.0  |
|        | 100.0 | 131.0 | 131.7 | 132.55 | 100.0 | 116.5 | 106.5 | 130.0 |
| 0=F    | —     | −31.0 | −31.7 | −32.55 | —     | −16.5 | −6.5  | −30.0 |
|        | 100.0 | 100.0 | 100.0 | 100.0  | 100.0 | 100.0 | 100.0 | 100.0 |

Two sets of samples were prepared from the glasses of Table XV and charged into porcelain crucibles. To one set of samples powdered $NH_4HF_2$ was added in an amount to yield a 1:3 volume ratio of $NH_4HF_2$ to glass. No addition was made to the second set of samples. Lids were placed upon the crucibles and the crucibles then moved into an electrically-fired furnace. Following the practice generally outlined above, the temperature within the furnace was raised at about ~250° C./hour to 900° C., held at 900° C. for 12 hours, and, once again, the furnace was permitted to cool to room temperature at furnace rate. In general, heat treating temperatures within the range of 850°–1000° C. will produce the desired fibers, with temperatures between about 850°–900° C. being preferred.

Table XVI provides a visual description of fiber growth. As employed therein, "Good" indicates fibers having lengths averaging about 0.5" and diameters between about 1–5 microns, with growth concentrated at sharp edges and ridges of the glass; "fair" signifies a sparser yield of fibers; "poor" denotes a very sparse yield, the fibers being mainly microscopic-sized. Only those glass samples containing the added $NH_4HF_2$ generated colorless, transparent, needle-like fibers. In like manner of the examples described above, fibers only occurred with a combination of $MoO_3$ and excess fluoride; neither $MoO_3$ nor excess fluoride alone produced fibers.

TABLE XVI

| Example No. | Visual Description |
|-------------|--------------------|
| 125         | None               |
| 126         | Fair               |
| 127         | Good               |
| 128         | Somewhat less than 127 |
| 129         | None               |
| 130         | Poor               |
| 131         | None               |
| 132         | None               |

An examination of Table XVI with Table XV indicates the need for careful control of the $MoO_3$ and F concentrations. Hence, $MoO_3$ levels between about 1–3 mole percent and excess F in amounts greater than about 15% yield the desired fibers. Examples 129 and 131 with added $NH_4HF_2$ were also treated at 950° C. for 24 hours, but no substantial formation of fibers was observed in either.

X-ray diffraction analysis of the fibers grown in Example 127 after heat treatment for 12 hours at 900° C. indicated the fibers were crystalline and spodumene-like in character. Thus, X-ray diffraction patterns derived therefrom exhibit some major peaks similar to those of spodumene, but also some other unidentifiable peaks. The spectrum corresponds to no currently-known crystal species. That the fibers do not possess a true monoclinic spodumene structure is not unexpected, however, since fluoride is not a normal component of the spodumene moiety.

X-ray diffraction and optical microscope studies of fibers grown in Example 127 after a heat treatment for 24 hours at 900° C. showed them to be amorphous, but of similar shape. It is hypothesized that excessive heat treatment results in depletion of fluoride in the spodumene crystal with resulting conversion to the glassy phase.

X-ray energy of dispersion analyses of both the crystalline and amorphous fibers indicated the presence of Al, Si, and Li with traces of Mo in each.

Table XVII records chemical analyses in weight percent of the glass prepared from Example 127, crystalline fibers grown by heat treating the glass of Example 127 for 12 hours at 900° C., and amorphous fibers resulting from heat treating the glass of Example 127 for 24 hours at 900° C. Table XVII also recites an empirical formula for each fiber as calculated from those analyses. Each formula was calculated on the basis of $Al_2O_3 = 1$ mole.

TABLE XVII

|          | Glass | Crystalline Fibers | Amorphous Fibers |
|----------|-------|--------------------|--------------------|
| $SiO_2$  | 59.95 | 58.15              | 61.53              |
| $Al_2O_3$ | 25.76 | 23.58              | 26.98              |
| $Li_2O$  | 7.12  | 6.92               | 6.75               |
| F        | 6.55  | 8.7                | 3.75               |
| $MoO_3$  | 2.47  | 3.34               | 3.15               |

Crystalline Fibers $Li_2O:Al_2O_3:4.19\ SiO_2:1.98\ F:0.1\ MoO_3$
Amorphous Fibers $0.85\ Li_2O:2Al_2O_3:3.87\ SiO_2:0.75\ F:0.083\ MoO_3$ As is apparent from Table XVII, the levels of F and $MoO_3$ in the crystalline fibers have increased significantly over those present in the precursor glass. That condition parallels the phenomenon observed above with respect to the fluormica and fluorapatite fibers, again suggesting a solid state-vapor phase mechanism for fiber growth. In contrast, the fluoride content of the amorphous fibers is less than one-half that present in the crystalline fibers, thereby indicating a loss of fluoride upon prolonged heat treatment. It is believed most significant that the empirical formula calculated from the chemical analysis of the crystalline fibers very closely approximates that of true spodumene with a slight increase in $SiO_2$ content (assuming $Al_2O_3 = 1.00$), and with about 2 gram atoms of fluoride per spodumene unit. In the amorphous fibers, however, the concentration of $Al_2O_3$ has effectively increased at the expense of $Li_2O$ and $SiO_2$; which circumstance can be expected from the loss of fluoride through the volatilization of LiF and $SiF_4$ from the fibers.

We claim:

1. Inorganic crystalline fibers containing an amount of $MoO_3$ and/or $WO_3$ and/or $As_2O_3$ up to about 5% by weight total and wherein the predominant crystal phase is selected from the group consisting of a fluormica, fluor-magnesio-richterite, lithium-containing proto-amphibole, canasite, potassium and/or sodium fluor-richterite, fluorapatite, and a fluoride-containing, spodumene-solid solution crystal.

2. Fibers according to claim 1 wherein said fluormica is selected from the group consisting of normal fluorophlogopite, boron fluorophlogopite, subpotassic aluminous phlogopite, tetrasilicic fluormica, and alkali metal-free, alkaline earth metal fluormica.

* * * * *

UNITED STATES PATENT AND TRADEMARK OFFICE
CERTIFICATE OF CORRECTION

PATENT NO. : 4,746,632
DATED : May 24, 1988
INVENTOR(S) : James E. Flannery et al.

It is certified that error appears in the above-identified patent and that said Letters Patent is hereby corrected as shown below:

Column 1, line 52, omit second occurrence of "(Ca,Mg)O-".

Column 3, line 67, "$Mo_2F_2$" should read --$MoO_2F_2$--.

Column 15, line 44, "independent" should read --dependent--.

Column 16, line 49, "phase" should read --base--.

Signed and Sealed this

Twenty-fourth Day of January, 1989

Attest:

DONALD J. QUIGG

*Attesting Officer*      *Commissioner of Patents and Trademarks*